US012098702B1

(12) United States Patent
Hodges

(10) Patent No.: US 12,098,702 B1
(45) Date of Patent: Sep. 24, 2024

(54) VERTICAL AXIS WIND ENERGY

(71) Applicant: Halcium Group LLC, West Bountiful, UT (US)

(72) Inventor: Nicholas Hodges, West Bountiful, UT (US)

(73) Assignee: Halcium, West Bountiful, UT (US)

(*) Notice: Subject to any disclaimer, the term of this patent is extended or adjusted under 35 U.S.C. 154(b) by 0 days.

(21) Appl. No.: 17/490,115

(22) Filed: Sep. 30, 2021

Related U.S. Application Data

(60) Provisional application No. 63/104,233, filed on Oct. 22, 2020.

(51) Int. Cl.
F03D 3/04 (2006.01)
F03D 3/00 (2006.01)

(52) U.S. Cl.
CPC ............... F03D 3/04 (2013.01); F03D 3/005 (2013.01); F05B 2240/211 (2013.01)

(58) Field of Classification Search
CPC ... F03D 3/02; F03D 3/04; F03D 3/005; F05B 2240/211
See application file for complete search history.

(56) References Cited

U.S. PATENT DOCUMENTS

| 1,595,578 | A | * | 8/1926 | Sovereign | F03D 15/10 415/208.5 |
| 2,094,603 | A | * | 10/1937 | Keene | F03D 3/068 416/111 |
| 3,944,840 | A | * | 3/1976 | Troll | F03D 3/0427 290/55 |
| 4,018,543 | A | * | 4/1977 | Carson | F03D 1/04 290/55 |
| 4,164,382 | A | * | 8/1979 | Mysels | F03D 3/04 415/4.4 |
| 4,452,562 | A | * | 6/1984 | Hsu | F03D 1/04 415/908 |
| 4,457,666 | A | * | 7/1984 | Selman, Jr. | F03D 3/0481 415/203 |
| 4,508,973 | A | * | 4/1985 | Payne | F03D 1/04 290/55 |
| 5,982,046 | A | | 11/1999 | Minh | |
| 6,749,399 | B2 | * | 6/2004 | Heronemus | A61P 29/00 416/41 |

(Continued)

FOREIGN PATENT DOCUMENTS

| CN | 112267975 A | * | 1/2021 | F03D 13/20 |
| CN | 115013236 A | * | 9/2022 | |

(Continued)

Primary Examiner — Justin D Seabe
Assistant Examiner — Wayne A Lambert
(74) Attorney, Agent, or Firm — Miller IP Law; Devin Miller

(57) ABSTRACT

A wind guide may include a top portion, a plurality of vanes coupled to an underside of the top portion, the vanes extending radially outward from a center of the top portion and extending along the underside of the top portion, and a bottom portion coupled to the plurality of vanes, opposite the top portion, to form a plurality of air channels each having a cross section that decreases towards the center of the top portion, the bottom portion comprising a circular plurality of exits disposed near a center of the bottom portion to allow air to exit the wind guide.

17 Claims, 4 Drawing Sheets

(56) References Cited

U.S. PATENT DOCUMENTS

| | | | | |
|---|---|---|---|---|
| 6,841,894 | B2 * | 1/2005 | Gomez Gomar | F03D 3/0409 |
| | | | | 290/55 |
| 6,952,058 | B2 | 10/2005 | McCoin | |
| 6,981,839 | B2 * | 1/2006 | Fan | F03D 3/002 |
| | | | | 415/4.1 |
| 8,128,337 | B2 * | 3/2012 | Pezaris | F03D 9/25 |
| | | | | 415/4.4 |
| 8,541,897 | B2 * | 9/2013 | Khoshnevis | F03D 9/28 |
| | | | | 290/55 |
| 8,791,588 | B2 * | 7/2014 | Steinlechner | F03D 15/10 |
| | | | | 290/55 |
| 8,961,103 | B1 * | 2/2015 | Wolff | F03D 3/02 |
| | | | | 415/4.4 |
| 9,294,013 | B2 | 3/2016 | Allaei | |
| 9,567,971 | B2 | 2/2017 | Bassett | |
| 10,184,446 | B1 | 1/2019 | Schuff | |
| 10,451,044 | B1 * | 10/2019 | Lentini | F03D 13/20 |
| 2001/0000197 | A1 * | 4/2001 | Gorlov | F03D 9/32 |
| | | | | 114/274 |
| 2002/0105190 | A1 * | 8/2002 | Thomas | F03D 7/06 |
| | | | | 290/55 |
| 2008/0163919 | A1 * | 7/2008 | Fein | F03D 3/005 |
| | | | | 136/244 |
| 2009/0015015 | A1 * | 1/2009 | Joutsiniemi | F03D 3/02 |
| | | | | 290/52 |
| 2009/0180878 | A1 * | 7/2009 | Alunni | F03D 3/005 |
| | | | | 416/198 R |
| 2009/0256360 | A1 * | 10/2009 | Candelas Perez | F03D 3/005 |
| | | | | 290/55 |
| 2010/0213722 | A1 * | 8/2010 | Scott | F03D 3/0409 |
| | | | | 290/55 |
| 2014/0021723 | A1 * | 1/2014 | Christy | F03D 9/007 |
| | | | | 290/55 |
| 2016/0003218 | A1 * | 1/2016 | Huang | F03D 3/005 |
| | | | | 416/197 A |
| 2016/0186718 | A1 | 6/2016 | Allaei | |
| 2016/0186726 | A1 | 6/2016 | Allaei | |
| 2017/0321657 | A1 * | 11/2017 | Clemo | F03B 13/10 |
| 2020/0200143 | A1 * | 6/2020 | Bird | F03D 9/37 |
| 2020/0217297 | A1 * | 7/2020 | Hossain | F03D 3/005 |
| 2020/0318616 | A1 * | 10/2020 | Barton | F03D 9/25 |

FOREIGN PATENT DOCUMENTS

| | | | | |
|---|---|---|---|---|
| KR | 20060025504 A | * | 3/2006 | F03D 3/04 |
| KR | 20200056104 A | * | 5/2020 | |
| WO | WO-2009011506 A1 | * | 7/2009 | |
| WO | WO-2013046011 A2 | * | 4/2013 | F03B 17/065 |

* cited by examiner

VERTICAL AXIS WIND ENERGY

CROSS-REFERENCE TO RELATED APPLICATIONS

The present application claims priority to U.S. Non-Provisional Patent Application No. 63/104,233 entitled "VERTICAL AXIS WIND ENERGY", filed on 22 Oct. 2020. The entire contents of the above-listed application are hereby incorporated by reference for all purposes.

BACKGROUND

Wind energy is a powerful source of energy. Wind turbine generally apply vanes or blades to translate energy from wind movement into movement of the turbine to generate electricity. Turbines may be generally classified by orientation relative to the rotational axis of the turbine. These orientations include vertical axis turbines and horizontal axis turbines. Horizontal axis turbines are susceptible to wind direction and must adjust while vertical axis wind turbines are generally not directionally specific.

BRIEF DESCRIPTION OF THE DRAWINGS

The present description will be understood more fully when viewed in conjunction with the accompanying drawings of various examples of vertical axis wind energy. The description is not meant to limit the vertical axis wind energy to the specific examples. Rather, the specific examples depicted and described are provided for explanation and understanding of vertical axis wind energy. Throughout the description the drawings may be referred to as drawings, figures, and/or FIGs.

DETAILED DESCRIPTION

Figure 1:
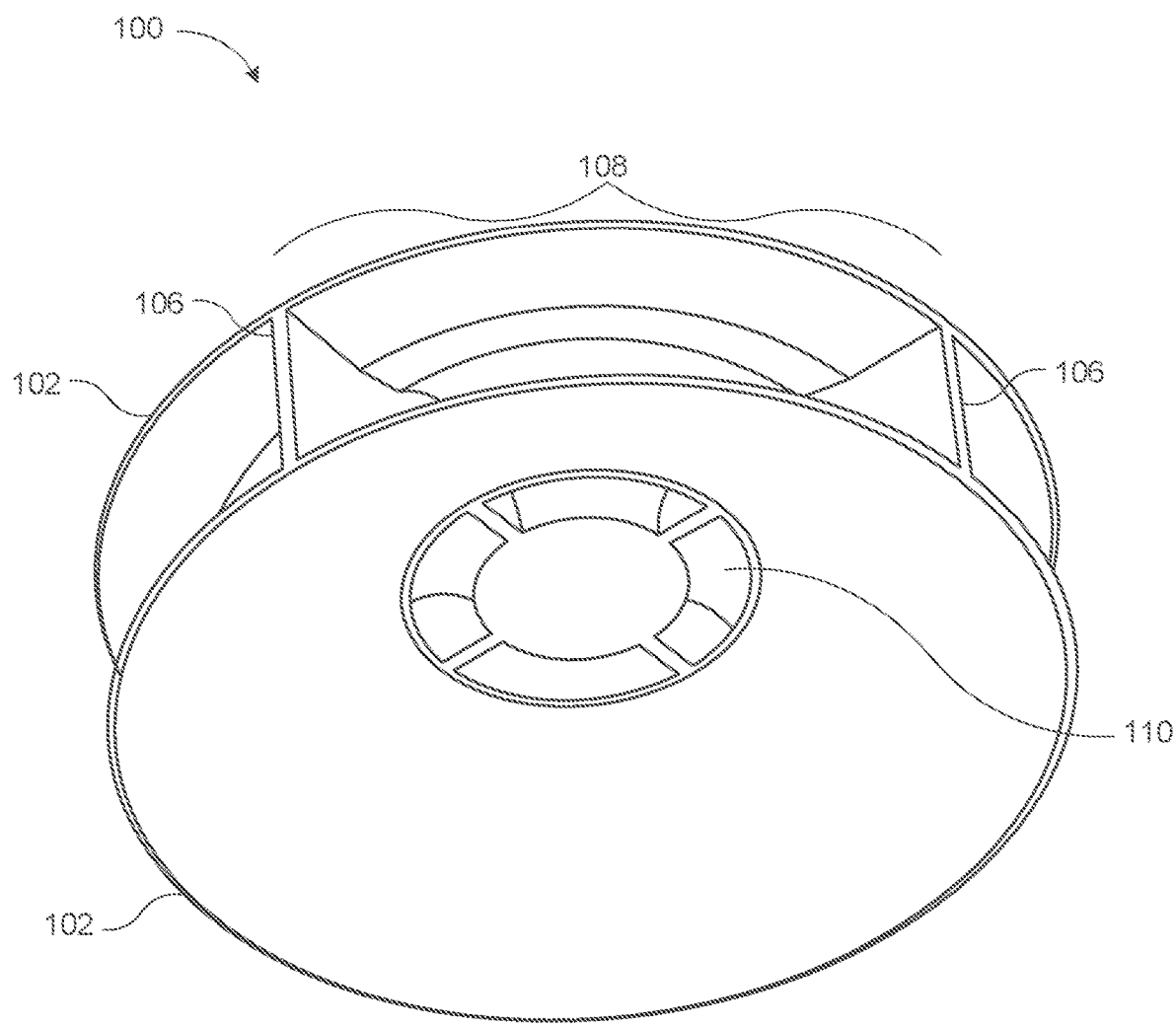
FIG. 1 depicts a bottom perspective view of one embodiment of a wind guide, according to an embodiment.

Vertical axis wind energy as disclosed herein will become better understood through a review of the following detailed description in conjunction with the figures. The detailed description and figures provide merely examples of the various embodiments of vertical axis wind energy. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

Embodiments described herein relate to a vertical axis wind energy harnessing system and method. Embodiments are capable of improving efficiency and power output on wind-based energy generation. Embodiments are capable of intaking wind energy from a wide range of input directions with lossless accommodation for changes in wind direction. Some embodiments of the system include a wind guide having a circular footprint with a variable radius and height. The wind guide may include a plurality of intakes along a perimeter of the wind guide. In some embodiments, the intakes are formed by an upper portion and a lower portion joined by vanes. The vanes may be oriented substantially vertical while the upper portion and the lower portion are oriented substantially horizontal. The vanes may couple to the upper portion and the lower portion to form an air channel with a cross section that decreases towards a center of the wind guide.

As wind passes into one or more of the plurality of intakes, the decreasing cross section of the air channel corresponding to the one or more of the plurality of intakes causes a Venturi Effect on the air. The Venturi Effect is defined as an increase in velocity balanced by a decrease in pressure. The increased velocity of the air flow is directed to a turbine to convert the movement of the air to electrical energy. The turbine may be oriented to receive the flow from an exit of the wind guide.

The Venturi Effect allows for a much lower activation speed than traditional turbines due to the enhancement to velocity. The increase in velocity also provides as increase in available power that may be harnessed with some test resulting in 15-50% increased power output. The design of the system allows for scalability from at or below 400 W to 12 kW and above. This provides for a distributed or centralized system that is flexible in application and cost and energy efficient in use.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts a bottom perspective view of one embodiment of a wind guide 100. The illustrated embodiment includes a top portion 102, a bottom portion 104, and a plurality of vanes.

In the illustrated embodiment, the top portion 102 of the wind guide 100 couples to the vanes 106. The vanes 106 also couple to the bottom portion 104. In some embodiments, the wind guide 100 includes a plurality of intakes 108 formed by the top portion 102 coupled to the bottom portion 104 by the vanes 106. Each intake 108 forms an opening in the wind guide 100 to allow wind to enter the wind guide 100. Because the plurality of intakes 108 covers the perimeter of the wind guide 100, the wind guide 100 is capable of receiving wind from 360° around the wind guide 100 without need for movement or adjustment of the wind guide 100. As the wind enters one or more of the plurality of intakes 108, the wind is directed radially inward towards a center of the wind guide 100 to a corresponding exit 110. In the illustrated embodiment, the wind guide 100 the wind enters the intake 108 on an approximately horizontal trajectory. As the wind moves radially inward, the wind guide 100 redirects the wind downward, or substantially orthogonal to the intake direction, through the exit 110. While the exit 110 is shown as being formed in the bottom portion 104 of the wind guide 100, the exit 110 may also be formed in the top portion 102 of the wind guide 100.

In the illustrated embodiment, the wind is subjected to a decreasing cross section as the wind moves from the intake 108 to the exit 110. The decreasing cross section causes an increase in velocity of the wind due to the Venturi Effect. In some embodiments, the vanes form horizontally decreasing cross section 106 with the top portion 102 and the bottom portion 104 substantially parallel. In other embodiments, the top portion 102 and the bottom portion 104 converge relative to one another to form a vertically decreasing aspect of the cross section.

In some embodiments, the top portion 102 has a constant thickness. In other embodiments, the top portion 102 has a variable thickness. In the illustrated embodiment, the top portion 102 includes a raised portion near the center of the wind guide 100. In other embodiments, the top portion 102 is planar. In the illustrated embodiment, the top portion 102 has a substantially round geometry. In other embodiments, the top portion 102 may include corners, flanges, points, scallops, fins, or other geometries or structures incorporated on the edge or the body of the top portion 102. In some embodiments, the geometry and/or structure of the top portion 102 may coincide with the location of the vanes 106, the intake 108, or the exit 110.

In the illustrated embodiment, the bottom portion 104 has a conical geometry. The bottom portion 104 may have a constant or variable thickness. In the illustrated embodiment, the bottom portion 104 has a substantially circular perimeter. Similar to the top portion 102, as described above, the bottom portion 104 may also include corners, flanges, points, scallops, fins, or other geometries or structures incorporated at the edge or the body of the bottom portion 104. In some embodiments, the geometry and/or structure of the bottom portion 104 may coincide with the location of the vanes 106, the intake 108, and/or the exit 110.

In the illustrated embodiment, each exit 110 is formed in the bottom portion 110. Each exit 110 provides a pathway for wind to flow out of the wind guide 100. In some embodiments, each exit 110 corresponds with a respective intake 108. The exit 110 may be formed by one or more vanes 106 partitioning the top portion 102 and the bottom portion 104. In the illustrated embodiment, the exits 110 are arcuate and centered around a midpoint of the top portion 102 and/or the bottom portion 104. As illustrated, the exits 110 may form a concentric ring separated into individual exits 110 by the vanes 106. The exits 110, alternatively, may form a divided circle. For example, the vanes 106 may converge in the center of the bottom portion 104 and to portion 102 dividing an open circular aperture in at least one of the bottom portion 104 and the top portion 102. The exits 110 may take the shape of a circular sector or sector of the aperture in the bottom portion 104. Other examples include other geometries or shapes formed by the exits 110.

The wind guide 100 may include four exits 110, as illustrated, fewer than four exits 110, or more than four exits 110. In some embodiments, the number of exits 110 is dependent upon the number of vanes 106. For example, "n" number of vanes 106 may form "n–1" number of exits 110. Alternatively, one exit 110 may correspond to multiple intakes 108.

Figure 2:
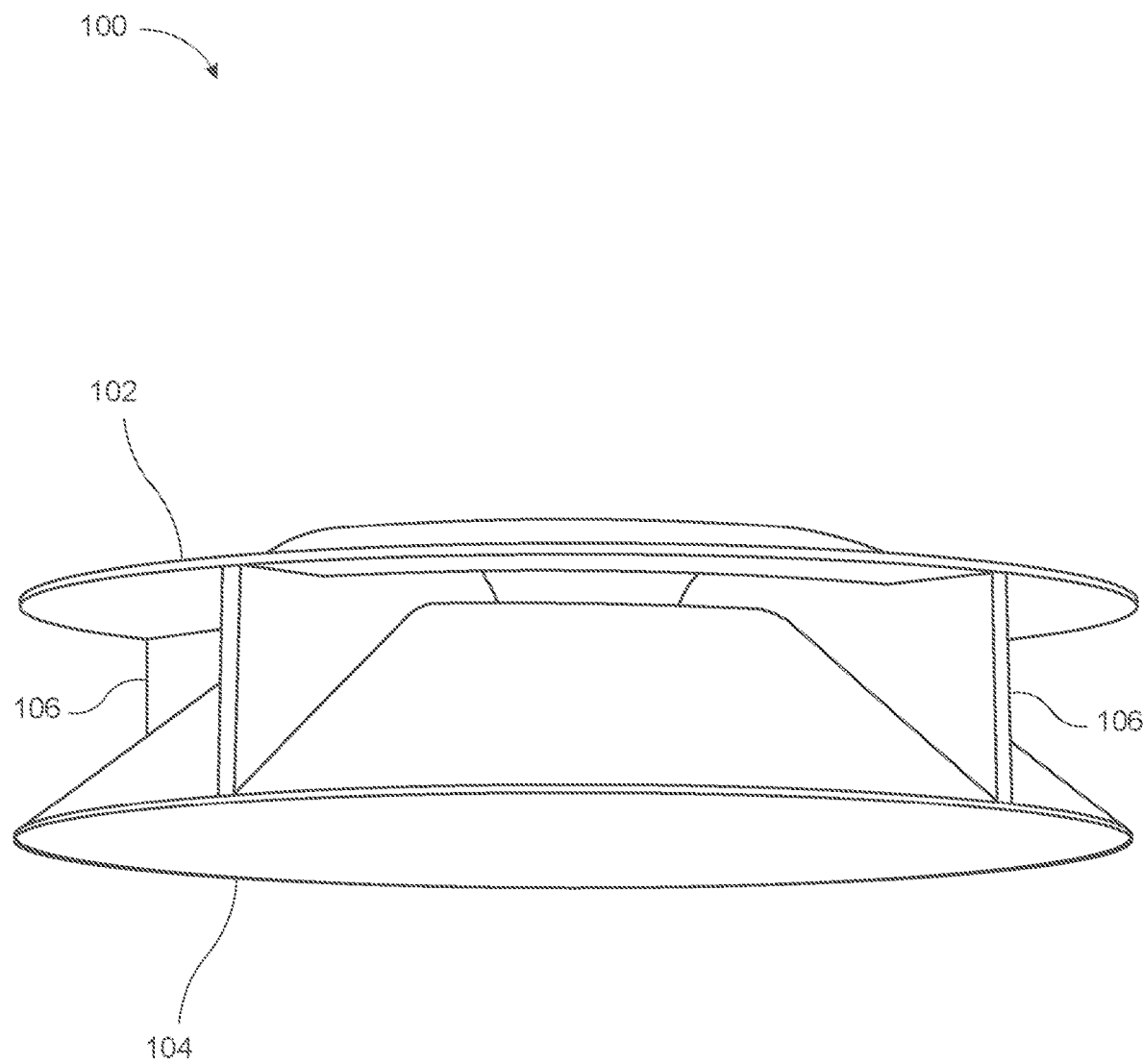
FIG. 2 depicts a side view of one embodiment of the wind guide, according to an embodiment.

FIG. 2 depicts a side view of one embodiment of the wind guide 100. In the illustrated embodiment, the vanes 106 are vertical or orthogonal relative to the top portion 102 and the bottom portion 104. One or more of the vanes 106 may be oriented at a non-ninety-degree angle relative to at least one of the top portion 102 and the bottom portion 104. The vanes 106 are shown as having a uniform thickness, however, the vanes 106 may also have a variable thickness. For example, one or more of the vanes 106 may have a thickness that varies based on distance from the center of the wind guide 100. One or more of the vanes 106 may also have a thickness that varies based on distance from one or both of the top portion 102 and the bottom portion 104. The vanes 106 may be a separate structure that is formed and connected to one or both of the top portion 102 and the bottom portion 104 or may be integrally formed during formation of the top portion 102 and the bottom portion 104. In some embodiments one or more of the vanes 106 are fixed while, in other embodiments, one or more of the vanes 106 are adjustable and/or removable.

Additionally, the illustrated embodiments are not presented or shown to any particular scale or measure. For example, in some embodiments, the outer edge of the vanes 106 may be shorter than, equal to, or longer than a diameter of the wind guide 100. In the illustrated embodiment, the vanes 106 are shown as extending radially outward from the center of the wind guide 100 along a straight or linear path. The vanes 106 may also follow a curvilinear or non-linear path outward from the center of the wind guide 100.

In some embodiments, one or more edges of one or more of the vanes 110, the top portion 102, and the bottom portion 104 may be squared, rounded, bladed, or the like, or may include structures such as a lip, a spoiler, a roughening, a polish, or the like. Other surfaces and structures of the wind guide 100 may include other surface treatments or structures that may be incorporated.

Figure 3:
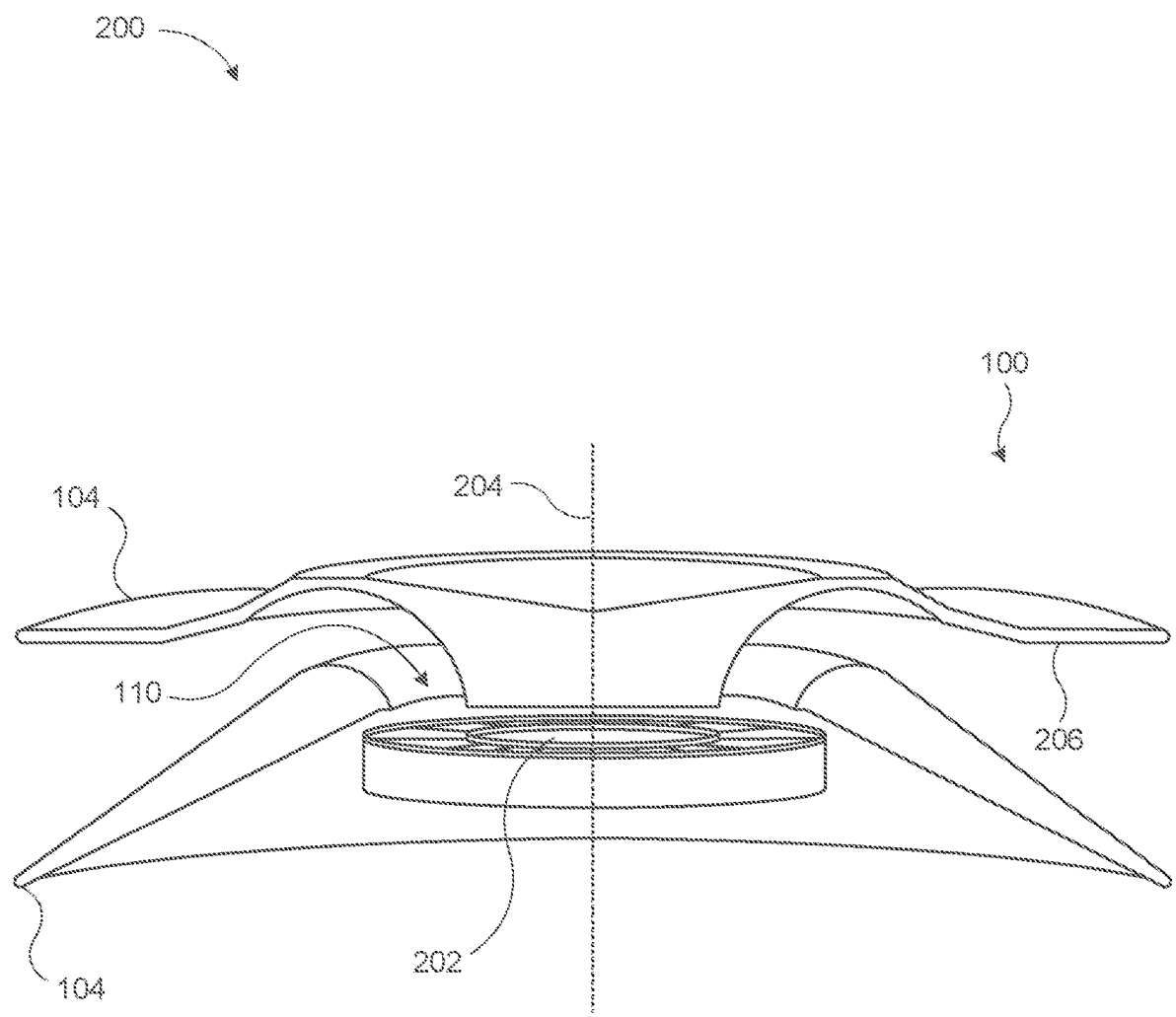
FIG. 3 depicts a partial cross-sectional view of a vertical axis wind energy system, according to an embodiment.

FIG. 3 depicts a partial cross-sectional view of a vertical axis wind energy system 200. In the illustrated embodiment, the system 200 includes the wind guide 100 of FIGS. 1 and 2 with a turbine 202 disposed relative to the wind guide 100.

While the illustrated embodiment depicts the turbine 202 as a ring turbine, various different types and shapes of turbines, fans, and the like, may be used to harness the energy of the wind as the wind leaves the exit 110 of the wind guide 100. In the illustrated embodiment, the turbine 202 is positioned proximal the exit 110 to capture wind energy by spinning the turbine 202. The turbine 202 may be coupled to a generator capable of converting mechanical motion into electric power. The turbine 202 may also be coupled to a system capable of utilizing the mechanical energy of the system to do work. The turbine 202 may alternatively be coupled to an energy storage system. Other embodiments include other manners of utilizing the rotational motion of the turbine 202.

In the illustrated embodiments, the turbine 202 rotates about a central axis 204. The central axis 204 may correspond to a center of mass or central axis of the wind guide 100. The turbine 202 may be secured to the wind guide 100 or to a structure separate from the wind guide 100.

In the illustrated embodiment, the upper portion 102 of the wind guide 206 has a non-planar geometry. The upper portion 102 of the wind guide 206 may include a curvature or non-linear geometry to facility redirection of the wind from a substantially horizontal direction of flow to a substantially vertical direction of flow. Even though the illustrated embodiment is closed, the upper portion 102 may include a hollow region in the middle of the wind guide 100 to reduce weight and prevent catch and build-up of water, debris, insects, and the like. In some embodiments, the top portion 102 extends downward in to the bottom portion 104. This may provide a mounting point for the turbine 202 and provide other structural accommodations.

The top portion 102 includes a top portion flow surface 206. The top portion flow surface 206 may have a geometry to form a decreasing cross section with the bottom portion 104 of the wind guide 100. In the illustrated embodiment, the bottom portion 104 has an airfoil profile. The bottom portion 104 may include other profiles with a variable or constant thickness.

Figure 4:
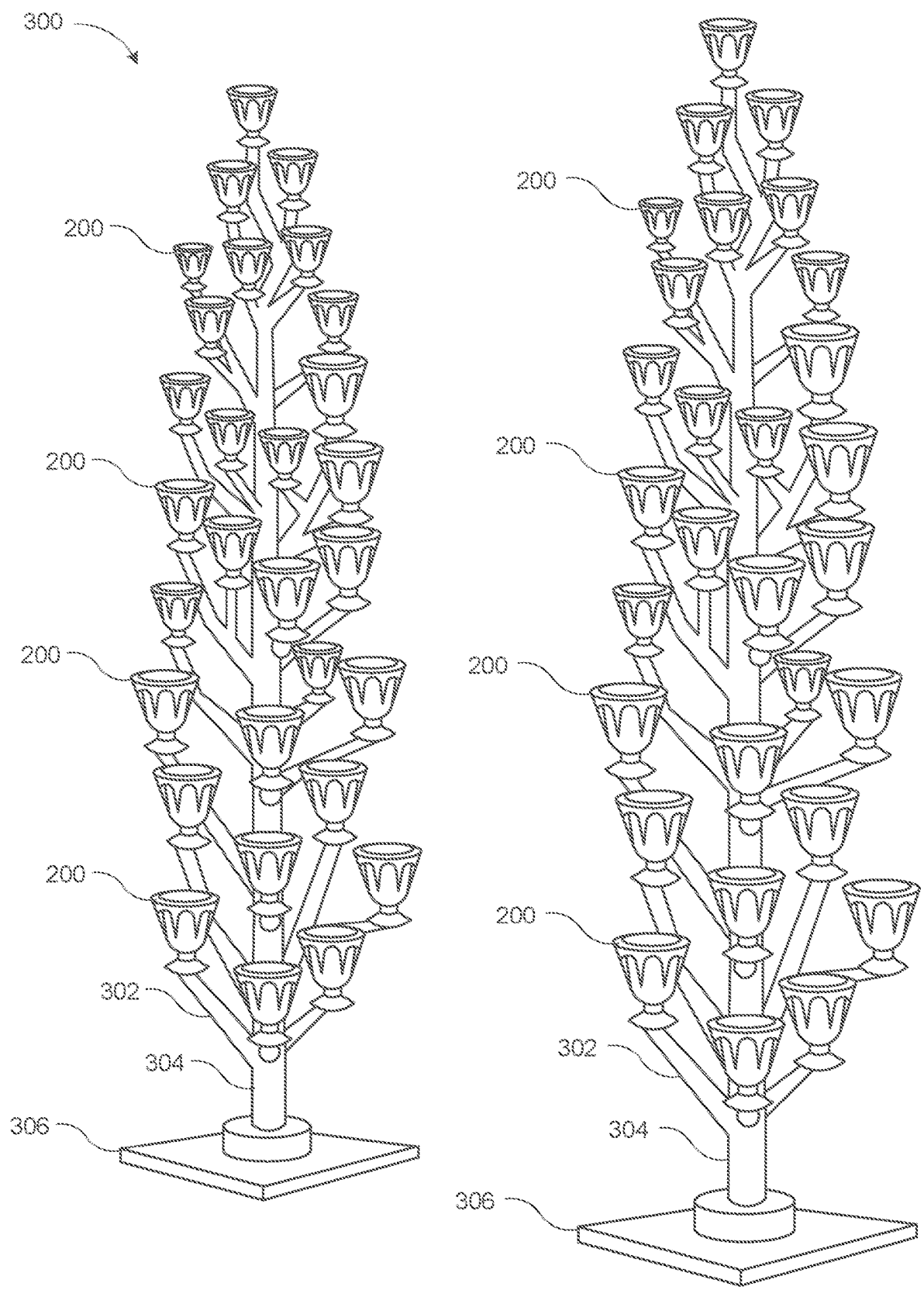
FIG. 4 depicts a perspective view of one embodiment of a plurality of wind energy arrays, according to an embodiment.

FIG. 4 depicts a perspective view of one embodiment of a plurality of wind energy arrays 300. In the illustrated embodiment, each array 300 includes a plurality of vertical axis wind energy systems 200. Each of the plurality of vertical axis wind energy systems 200 is coupled to a support member 302. The support members 302 may correspond to one or more of the plurality of vertical axis wind energy systems 200. The support members 302 may provide structural support to each of the plurality of vertical axis wind energy systems 200. In the illustrated embodiment, the support members 302 couple to each of the plurality of vertical axis wind energy systems 200 at a bottom portion of the plurality of vertical axis wind energy systems 200. The support members 302 may also attach at a side or top portion of the plurality of vertical axis wind energy systems 200. The support members 302 may be fixed or moveable to position the plurality of vertical axis wind energy systems 200 in advantageous exposure to a wind. The support members 302 may include electrical or other energy transmission systems such as wires, drives, fluid lines, or the like to carry energy from the plurality of vertical axis wind energy systems 200.

The illustrated embodiment of the arrays 300 also includes a primary support 304. The primary supports 304 may provide principle structural support for the arrays 300. Additionally, the primary supports 304 may provide a channel or conduit for transmitting energy (mechanical, electrical, etc.) from the plurality of vertical axis wind energy systems 200. The primary supports 304 may couple to a base 306 or other ground interface. Alternatively, the primary supports 304 may couple to a wall support, hanging support, cantilever support, floating support, or the like. In some embodiments, the arrays 300 may include masking or decorative color or paint schemes to blend in with natural surroundings or change or increase the aesthetic qualities of the arrays 300. In some embodiments, the arrays 300 include no externally accessible moving parts to reduce risk of injury or harm. In some embodiments, the arrays 300 are self-cleaning using rain or irrigation water to clean and clear the plurality of vertical axis wind energy systems 200. In some embodiments, the arrays are weather resistant. The arrays 300 may also be supplemented with solar, hydro, and other energy harnessing systems or capabilities.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e. methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

Applicant reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:
1. An apparatus comprising:
a top portion;
a plurality of vanes, wherein at least one of the plurality of vanes comprising:
  a first portion with a non-linear geometry coupled to an underside of the top portion; and
  a second portion with a linear geometry, wherein:
    the first portion with the non-linear geometry extends:
      radially outward from a center of the top portion; and
      along the underside of the top portion; and
    the second portion with linear geometry extends radially outwardly from an outer perimeter of the first portion;
a bottom portion coupled to the plurality of vanes having non-linear geometry, opposite the top portion, to form a plurality of air channels each having a cross section that decreases towards the center of the top portion, the bottom portion comprising a circular plurality of exits disposed near a center of the bottom portion to allow air to exit the apparatus;
a ring turbine disposed proximally to the circular plurality of exits wherein the ring turbine further comprises a ring turbine oriented substantially vertically:
an array comprising:
  a plurality of wind systems asymmetrically coupled to a plurality of non-planar support members, the wind system comprising:
    the top portion:
    the plurality of vanes:
    the bottom portion; and
    the ring turbine;
  a primary support coupled to the plurality of non-planar support members,
  a base coupled to the primary support.

2. The apparatus of claim 1, further comprising a turbine disposed downstream from the circular plurality of exits.

3. The apparatus of claim 1, wherein the bottom portion is shaped to angle towards the top portion relative to radial proximity to the center of the top portion.

4. The apparatus of claim 1, wherein the top portion has a first planar section near an outer perimeter of the top portion and a second planar section, offset from the first planar section in a direction opposite the bottom portion, proximate the center of the top portion.

5. The apparatus of claim 4, wherein the first planar section and the second planar section are parallel.

6. The apparatus of claim 4, wherein the top portion further comprises a transition section connecting the first planar section and the second planar section wherein the transition section is non parallel to the first planar section and the second planar section.

7. The apparatus of claim 1, wherein a geometry of the bottom portion is linear in a radial direction.

8. The apparatus of claim 1, wherein a geometry of the bottom portion is nonlinear in a radial direction.

9. The apparatus of claim 1, wherein the plurality of vanes having non-linear geometry come together at the circular plurality of exits to form a circular region with the top portion.

10. The apparatus of claim 1, wherein at least one of the plurality of vanes having non-linear geometry have a constant thickness.

11. The apparatus of claim 1, wherein at least one of the plurality of vanes having non-linear geometry have a variable thickness.

12. An apparatus comprising:
a top portion;
a first vane having non-linear geometry and a second vane having non-linear geometry coupled to an underside of the top portion, wherein:
the first vane having non-linear geometry and the second vane having non-linear geometry extend radially outward from a center of the top portion;
the first vane having non-linear geometry and the second vane having non-linear geometry extend along the underside of the top portion; and
a first portion of the first vane or the second vane with the non-linear geometry extends:
radially outward from a center of the top portion; and
along the underside of the top portion; and
a second portion of the first vane or the second vane comprises linear geometry that extends radially outwardly from an outer perimeter of the first portion;
the top portion and the first vane having non-linear geometry or the second vane having non-linear geometry are configured to receive wind in a first direction at a first intake positioned radially around a wind guide having non-linear geometry;
a bottom portion coupled to the first vane having non-linear geometry and the second vane having non-linear geometry, wherein:
the bottom portion is opposite the top portion;
the bottom portion and the first vane having non-linear geometry or the second vane having non-linear geometry are configured to form at least one air channel having a cross section that decreases towards the center of the top portion;
the first vane having non-linear geometry or the second vane having non-linear geometry is configured to direct the wind through at least one air channel in the wind guide having non-linear geometry;
the apparatus is configured to increase a velocity of the wind through the at least one air channel with a cross section of the at least one air channel that decreases with radial proximity to a center of the wind guide having non-linear geometry; and
the bottom portion comprises at least one circular exit disposed near a center of the bottom portion to allow air to exit the wind guide having non-linear geometry, wherein the at least one circular exit exhausts the wind to leave the wind guide having non-linear geometry in a second direction approximately perpendicular to the first direction;
a ring turbine, oriented substantially vertically, configured to activate as the exhausted wind passes through the turbine; and
an array comprising:
a plurality of wind systems asymmetrically coupled to a plurality of non-planar support members, the wind system comprising:
the top portion:
the first and second vanes:
the bottom portion; and
the ring turbine;
a primary support coupled to the plurality of non-planar support members,
a base coupled to the primary support.

13. The apparatus of claim 12, wherein the wind guide having non-linear geometry is configured to receive wind at a second intake positioned radially around the wind guide having non-linear geometry in response to a change in direction of the wind.

14. An apparatus comprising:
a top portion of a wind guide having non-linear geometry;
an at least one vane having non-linear geometry coupled to an underside of the top portion, wherein:
the at least one vane having a first portion with a non-linear geometry that extends radially outward from a center of the top portion;
the at least one vane having non-linear geometry extends along the underside of the top portion;
the at least one vane having a second portion with a linear geometry, wherein:
the first portion with the non-linear geometry extends:
radially outward from a center of the top portion; and
along the underside of the top portion; and
the second portion with linear geometry extends radially outwardly from an outer perimeter of the first portion;
the top portion and the at least one vane having non-linear geometry is configured to receive wind in a first direction at a first intake positioned radially around the wind guide having non-linear geometry; and
a bottom portion of the wind guide having non-linear geometry coupled to the at least one vane having non-linear geometry, wherein:
the bottom portion is opposite the top portion;
the bottom portion and the at least one vane having non-linear geometry is configured to form an air channel having a cross section that decreases towards the center of the top portion;
the at least one vane having non-linear geometry is configured to direct the wind through at the least one air channel in the wind guide having non-linear geometry;
the apparatus is configured to increase a velocity of the wind through the air channel with a cross section of the air channel that decreases with radial proximity to a center of the apparatus;
the bottom portion comprises a circular exit disposed near a center of the bottom portion to allow air to exit the wind guide having non-linear geometry, wherein the circular exit exhausts the wind to leave the wind guide having non-linear geometry in a second direction approximately perpendicular to the first direction;
a ring turbine, oriented substantially vertically; and
an array comprising:
a plurality of wind systems asymmetrically coupled to a plurality of non-planar support members, the wind system comprising:
the top portion;
the at least one vane:
the bottom portion; and the ring turbine;
a primary support coupled to the plurality of non-planar support members,
a base coupled to the primary support.

15. The apparatus of claim 14, further comprising a turbine configured to activate as the exhausted wind passes through the turbine.

16. The apparatus of claim 15, further comprising a turbine disposed downstream from the circular exits.

17. The apparatus of claim 14, further comprising a plurality of vanes having non-linear geometry.

* * * * *